United States Patent
Liang

(10) Patent No.: US 10,915,195 B1
(45) Date of Patent: Feb. 9, 2021

(54) ELECTRONIC APPARATUS

(71) Applicants: AU Optronics (Suzhou) Corp., Ltd., Suzhou (CN); AU Optronics Corporation, Hsin-Chu (TW)

(72) Inventor: Xin Liang, Hsin-Chu (TW)

(73) Assignees: AU OPTRONICS (SUZHOU) CORP., LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/747,173

(22) Filed: Jan. 20, 2020

(30) Foreign Application Priority Data

Sep. 17, 2019 (CN) .......................... 2019 1 0874542

(51) Int. Cl.
   *G06F 3/041* (2006.01)

(52) U.S. Cl.
   CPC .. *G06F 3/0412* (2013.01); *G06F 2203/04103* (2013.01)

(58) Field of Classification Search
   CPC ......... G06F 3/0412; G06F 2203/04103; G06F 3/041; G06F 3/044; G06F 3/0488
   See application file for complete search history.

(56) References Cited

U.S. PATENT DOCUMENTS

| | | | | |
|---|---|---|---|---|
| 2010/0013787 A1* | 1/2010 | Takahashi | ............... | G06F 3/041 345/173 |
| 2012/0212425 A1* | 8/2012 | Schmidt | .................. | G06F 3/047 345/173 |
| 2013/0038551 A1* | 2/2013 | Shirai | ..................... | G06F 3/041 345/173 |
| 2016/0011684 A1* | 1/2016 | Zhang | .................... | G06F 3/016 345/173 |

FOREIGN PATENT DOCUMENTS

| | | |
|---|---|---|
| CN | 101644849 | 2/2010 |
| CN | 101893764 | 11/2010 |
| CN | 104793364 | 7/2015 |
| CN | 106898274 | 6/2017 |
| CN | 208848553 | 5/2019 |

* cited by examiner

*Primary Examiner* — Md Saiful A Siddiqui
(74) *Attorney, Agent, or Firm* — WPAT, PC

(57) ABSTRACT

An electronic apparatus includes a touch panel, a frame, a display panel, a spacer and a plurality of adjusting elements. The display panel is at least partially disposed between the touch panel and the frame. The spacer is connected with a side of the display panel facing to the frame. The adjusting elements are at least partially embedded in the frame and at least partially rotatable relative to the frame. Each of the adjusting elements has an elliptical structure slidably connected with the spacer. When at least one of the elliptical structures rotates, the spacer is pressed by the corresponding elliptical structure, such that the spacer and the display panel move towards the touch panel until the display panel is in contact with the touch panel.

9 Claims, 4 Drawing Sheets

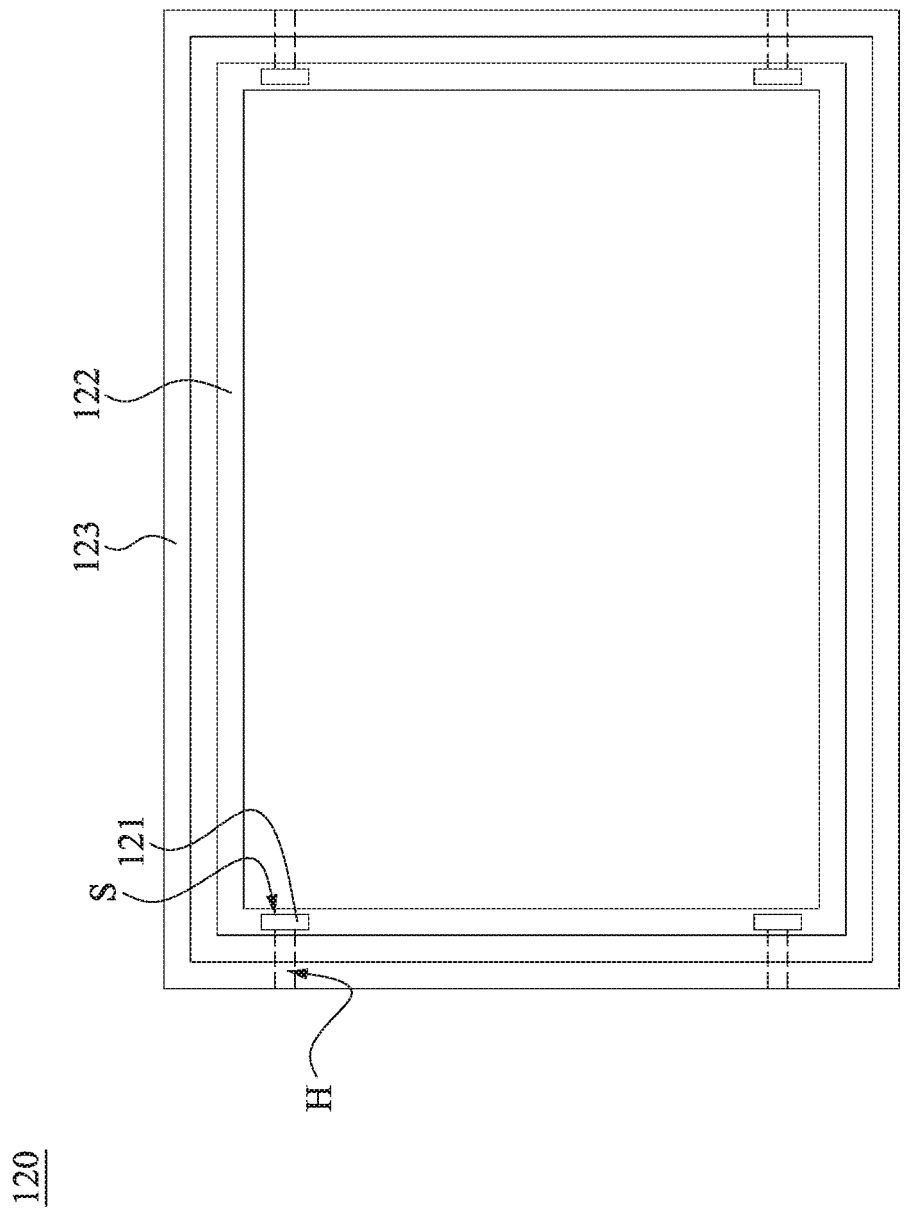

ELECTRONIC APPARATUS

RELATED APPLICATIONS

This application claims priority to Chinese Application Serial Number 201910874542.4 filed Sep. 17, 2019, which is herein incorporated by reference.

BACKGROUND

Technical Field

The present disclosure relates to electronic apparatus.

Description of Related Art

With the rapid development of electronic products, the demand on the quality of the electronic products has been correspondingly increasing. To fulfill the demand of consumers, apart from enhancing the performance of individual components inside an electronic product, the precision of the connections or adhesions between the components needs to be continuously improved as well.

With regard to the production process of touch panels, how to maintain the touching effect and the rate of emittance of the electronic products is undoubtedly an important issue for the industry in the aspect of quality improvement.

SUMMARY

A technical aspect of the present disclosure is to provide an electronic apparatus which can allow the user to make the display panel to be in contact with the touch panel outside the frame in a simple and convenient manner, such that the touching effect and the rate of emittance of the electronic apparatus can be maintained, and the structural strength of the electronic apparatus can be reinforced.

According to an embodiment of the present disclosure, an electronic apparatus includes a touch panel, a frame, a display panel, a spacer and a plurality of adjusting elements. The display panel is at least partially disposed between the touch panel and the frame. The spacer is connected with a side of the display panel facing to the frame. The adjusting elements are at least partially embedded in the frame and at least partially rotatable relative to the frame. Each of the adjusting elements has an elliptical structure slidably connected with the spacer. When at least one of the elliptical structures rotates, the spacer is pressed by the corresponding elliptical structure, such that the spacer and the display panel move towards the touch panel until the display panel is in contact with the touch panel.

In one or more embodiments of the present disclosure, each of the adjusting elements has a transmission portion. The transmission portion is connected with the corresponding elliptical structure. The transmission portions at least partially penetrate through the frame and are exposed outside the frame.

In one or more embodiments of the present disclosure, the frame has a plurality of through holes configured to allow the transmission portions to penetrate through.

In one or more embodiments of the present disclosure, each of the transmission portions has a groove. The groove is located at an end of the corresponding transmission portion away from the corresponding elliptical structure.

In one or more embodiments of the present disclosure, the frame has a plurality of abutting surfaces. Each of the abutting surfaces is curved along a circular locus. Each of the abutting surfaces defines an accommodation space. The elliptical structures are at least partially located inside the accommodation spaces respectively.

In one or more embodiments of the present disclosure, each of the elliptical structures has a long diameter. Each of the accommodation spaces has a diameter. The long diameters and the diameters are substantially the same.

In one or more embodiments of the present disclosure, each of the elliptical structures has a plurality of first jagged structures. Each of the abutting surfaces has a plurality of second jagged structures. Each of the first jagged structures and the corresponding second jagged structure are at least partially coupled with each other.

In one or more embodiments of the present disclosure, the frame has a first surface adjacent to the abutting surfaces. Each of the accommodation spaces has a depth relative to the first surface. The long diameters are longer than the depths.

In one or more embodiments of the present disclosure, each of the elliptical structures has a short diameter. The short diameters are shorter than the depths.

In one or more embodiments of the present disclosure, the frame has a second surface configured to connect with the touch panel.

When compared with the prior art, the above-mentioned embodiments of the present disclosure have at least the following advantages:

(1) The user can use a simple hand tool, such as a screwdriver, to snap with the groove of the adjusting element outside the frame in order to drive the transmission portion and thus the elliptical structure to rotate about the axis, such that the spacer and the display panel move towards the touch panel until the display panel is in contact with the touch panel. Since the groove of the adjusting element is also exposed outside the frame, the user can make the display panel to be in contact with the touch panel outside the frame in a simple and convenient manner. Thus, the touching effect and the rate of emittance of the electronic apparatus can be maintained, and the structural strength of the electronic apparatus can be reinforced.

(2) Since the first jagged structures of the elliptical structure and the second jagged structures of the abutting surface are at least partially coupled with each other, no matter the magnitude of angle that the user rotates the adjusting element, by the mutual coupling between the first jagged structures of the elliptical structure and the second jagged structures of the abutting surface, the elliptical structure can be stably fixed relative to the frame.

(3) When the display panel has already been in contact with the touch panel and it is not necessary for the elliptical structure of the adjusting element to press the spacer, since the short diameter of the elliptical structure is shorter than the depth of the accommodation space, the user can rotate the adjusting element such that the elliptical structure can be completely accommodated inside the accommodation space, and the elliptical structure does not press on the spacer.

BRIEF DESCRIPTION OF THE DRAWINGS

The disclosure can be more fully understood by reading the following detailed description of the embodiments, with reference made to the accompanying drawings as follows:

FIG. 4 is a top view of the frame of FIG. 1.

DETAILED DESCRIPTION

Figure 1:
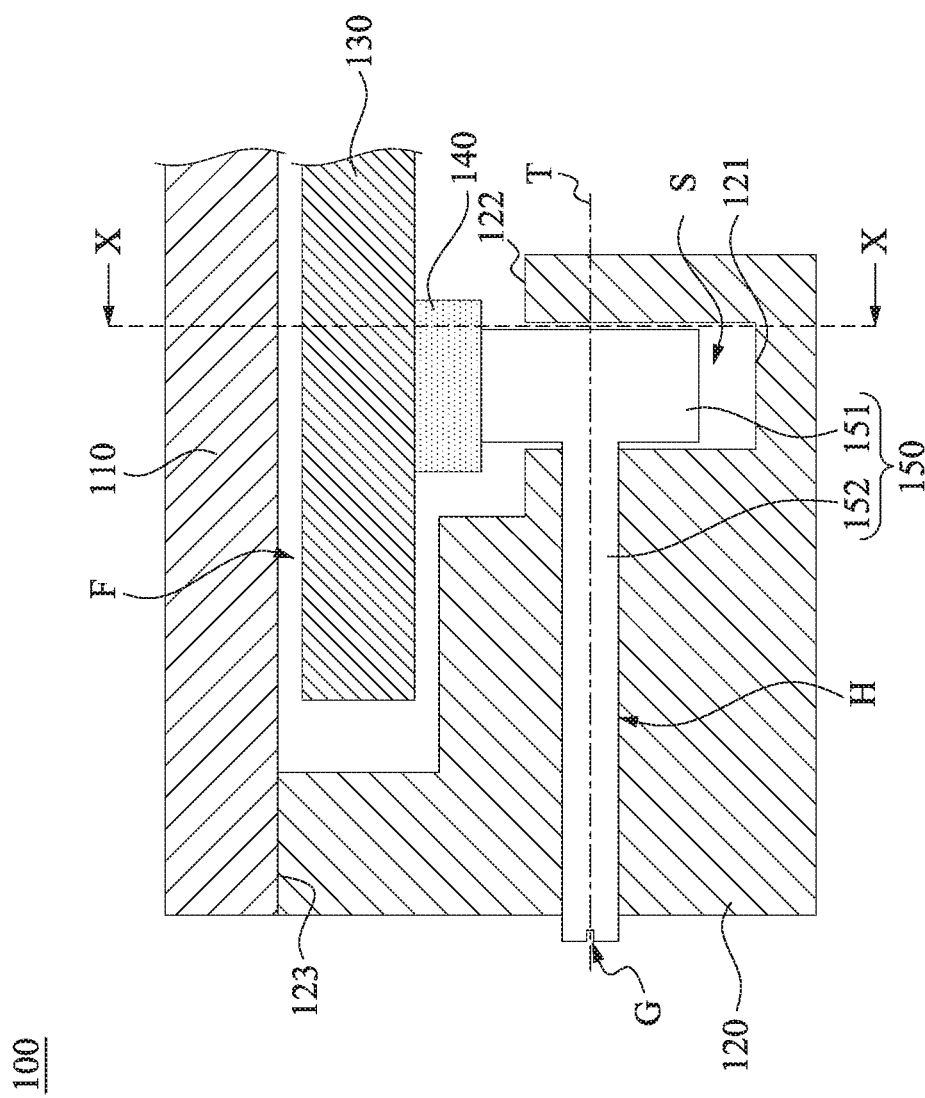
FIG. 1 is a cross-sectional view of an electronic apparatus according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a cross-sectional view of an electronic apparatus 100 according to an embodiment of the present disclosure. In this embodiment, as shown in FIG. 1, an electronic apparatus 100 includes a touch panel 110, a frame 120, a display panel 130, a spacer 140 and an adjusting element 150. The display panel 130 is at least partially disposed between the touch panel 110 and the frame 120. The spacer 140 is connected with a side of the display panel 130 facing to the frame 120. The adjusting element 150 is at least partially embedded in the frame 120 and at least partially rotatable relative to the frame 120 about an axis T. The adjusting element 150 has an elliptical structure 151 (please refer to FIGS. 2-3 for the elliptical profile of the elliptical structure 151). The elliptical structure 151 is slidably connected with the spacer 140. Moreover, the frame 120 has a second surface 123. The second surface 123 of the frame 120 is configured to connect with the touch panel 110.

Furthermore, because of the tolerances in manufacture, a gap F is easily formed between the touch panel 110 and the display panel 130. This means for the electronic apparatus 100 after factory, the touch panel 110 and the display panel 130 do not be in contact with each other. In other words, there will be an air gap between the touch panel 110 and the display panel 130. In this way, the touching effect of the electronic apparatus 100 will be affected, and the rate of emittance of the electronic apparatus 100 will be reduced. Moreover, the structural strength of the electronic apparatus 100 will also be weakened.

Figure 2:
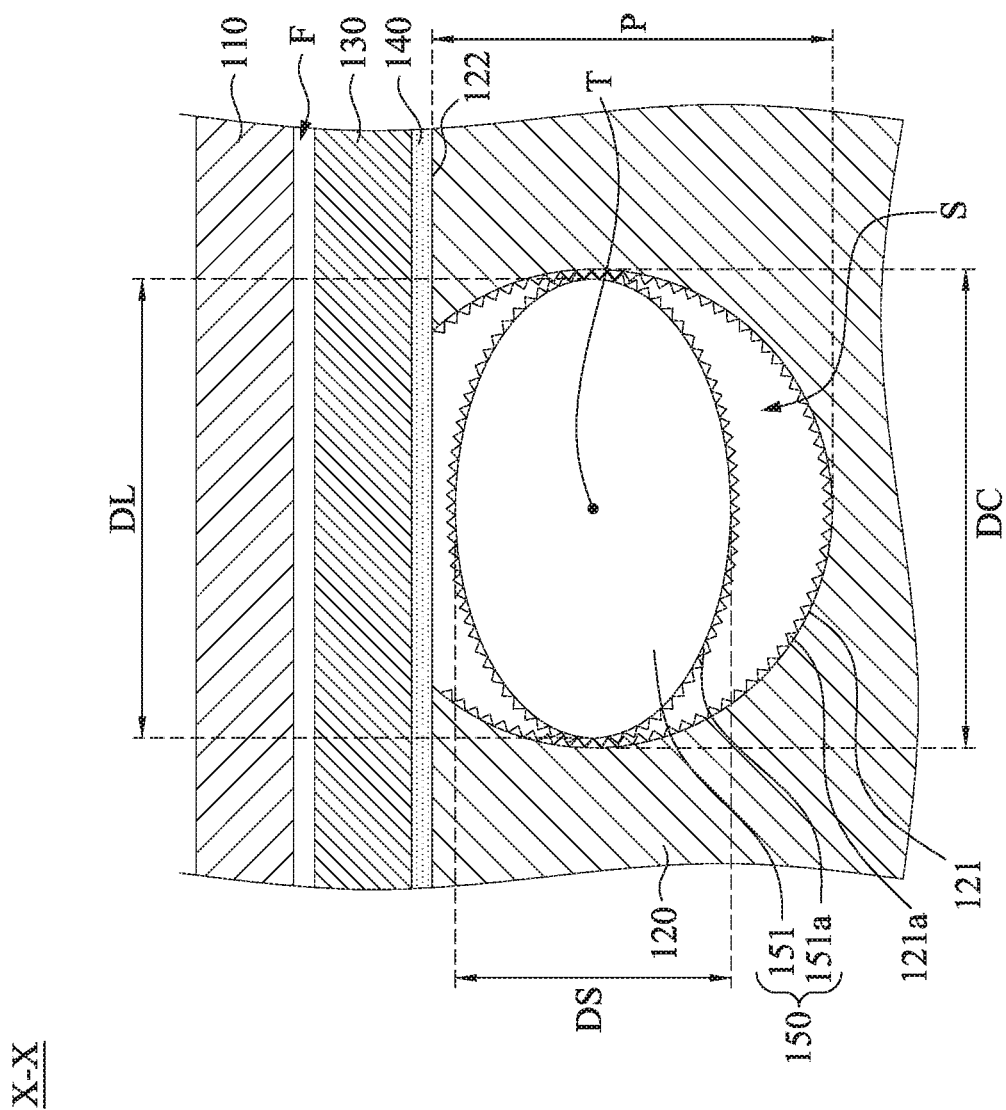
FIG. 2 is a cross-sectional view along the section line X-X of FIG. 1, in which the elliptical structure is completely located inside an accommodation space after rotation.
Figure 3:
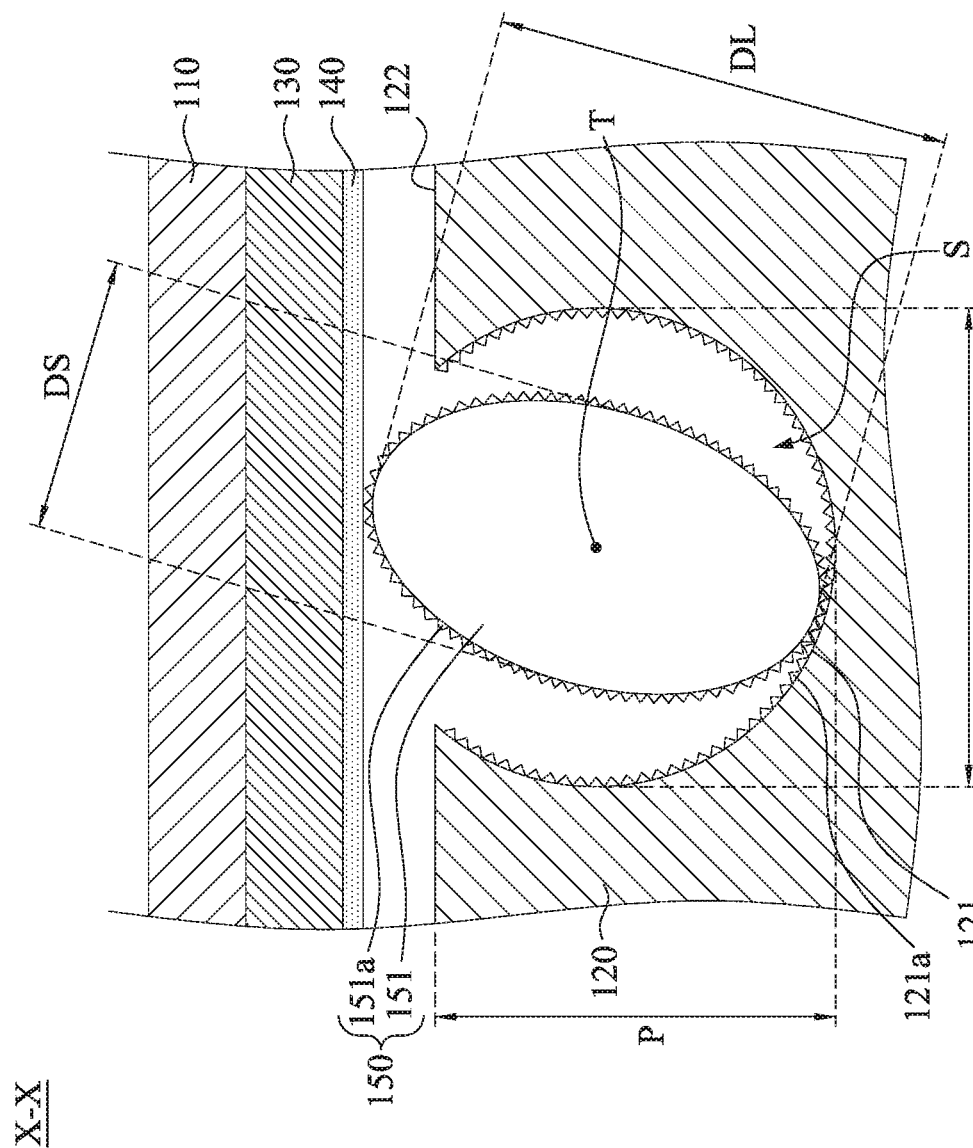
FIG. 3 is a cross-sectional view along the section line X-X of FIG. 1, in which the display panel is in contact with the touch panel after rotation of the elliptical structure.

Reference is made to FIGS. 2-3. FIG. 2 is a cross-sectional view along the section line X-X of FIG. 1, in which the elliptical structure 151 is completely located inside an accommodation space S after rotation. FIG. 3 is a cross-sectional view along the section line X-X of FIG. 1, in which the display panel 130 is in contact with the touch panel 110 after rotation of the elliptical structure 151. In this embodiment, as shown in FIGS. 2-3, when the elliptical structure 151 of the adjusting element 150 rotates about the axis T, a surface of the elliptical structure 151 in contact with the spacer 140 slides relative to the spacer 140, and the spacer 140 is pressed by the elliptical structure 151, such that the spacer 140 and the display panel 130 can move towards the touch panel 110 until the display panel 130 is in contact with the touch panel 110, as shown in FIG. 3.

As a result, in practical applications, by the pressing of the elliptical structure 151 to the spacer 140 as mentioned above, the display panel 130 can be in contact with the touch panel 110, such that the gap F no longer exists between the touch panel 110 and the display panel 130. In this way, the user can maintain the touching effect and the rate of emittance of the electronic apparatus 100 in a simple and easy manner. Moreover, the structural strength of the electronic apparatus 100 can be reinforced.

To be specific, the adjusting element 150 has a transmission portion 152. The transmission portion 152 is connected with the elliptical structure 151. The transmission portion 152 of the adjusting element 150 at least partially penetrates through the frame 120 and is exposed outside the frame 120. To be more specific, the frame 120 has a through hole H. As shown in FIG. 1, the transmission portion 152 of the adjusting element 150 has a shape of a rod. The through hole H is configured to allow the rod-shaped transmission portion 152 to penetrate through, such that an end of the transmission portion 152 away from the elliptical structure 151 is exposed outside the frame 120.

In addition, the transmission portion 152 of the adjusting element 150 has a groove G. The groove G is located at the end of the transmission portion 152 away from the elliptical structure 151. As mentioned above, the end of the transmission portion 152 away from the elliptical structure 151 is exposed outside the frame 120. Thus, the groove G of the adjusting element 150 is also exposed outside the frame 120. In this way, the user can use a simple hand tool, such as a screwdriver, to snap with the groove G of the adjusting element 150 outside the frame 120 in order to drive the transmission portion 152 and thus the elliptical structure 151 to rotate about the axis T, such that the spacer 140 and the display panel 130 move towards the touch panel 110 until the display panel 130 is in contact with the touch panel 110. Since the groove G of the adjusting element 150 is also exposed outside the frame 120, the user can make the display panel 130 to be in contact with the touch panel 110 outside the frame 120 in a simple and convenient manner. Thus, the touching effect and the rate of emittance of the electronic apparatus 100 can be maintained, and the structural strength of the electronic apparatus 100 can be reinforced.

Structurally speaking, the frame 120 has an abutting surface 121. As shown in FIGS. 2-3, the abutting surface 121 is curved along a circular locus. The abutting surface 121 further defines an accommodation space S. To be specific, the region surrounded by the abutting surface 121 is the accommodation space S. Moreover, the accommodation space S is communicated with the through hole H. In this embodiment, the elliptical structure 151 of the adjusting element 150 is at least partially located inside the accommodation space S of the frame 120.

In this embodiment, as shown in FIGS. 2-3, the elliptical structure 151 of the adjusting element 150 has a long diameter DL. The accommodation space S of the frame 120 has a diameter DC. Both of the long diameter DL and the diameter DC intersect with the axis T. In order to achieve the effect that the abutting surface 121 of the frame 120 can fix the elliptical structure 151 of the adjusting element 150, the long diameter DL of the elliptical structure 151 of the adjusting element 150 and the diameter DC of the accommodation space S are substantially the same. In other words, when the elliptical structure 151 of the adjusting element 150 rotates relative to the frame 120, the elliptical structure 151 and the abutting surface 121 of the frame 120 form at least one contact point therebetween, such that the elliptical structure 151 of the adjusting element 150 can be fixed relative to the frame 120. For example, as shown in FIG. 2, the elliptical structure 151 and the abutting surface 121 form two contact points therebetween. On the other hand, as shown in FIG. 3, the elliptical structure 151 and the abutting surface 121 form one contact point therebetween. In both of the statuses as shown in FIG. 2 and FIG. 3, the elliptical structure 151 of the adjusting element 150 can be fixed relative to the frame 120.

In order for the elliptical structure 151 of the adjusting element 150 to be fixed relative to the frame 120 in a more stable way, in this embodiment, as shown in FIGS. 2-3, the elliptical structure 151 has a plurality of first jagged structures 151a, and the abutting surface 121 has a plurality of second jagged structures 121a. In practical applications, the first jagged structures 151a of the elliptical structure 151 and the second jagged structures 121a of the abutting surface 121 are at least partially coupled with each other. In this way, no matter the magnitude of angle that the user rotates the adjusting element 150, by the mutual coupling between the first jagged structures 151a of the elliptical structure 151 and the second jagged structures 121a of the abutting surface 121, the elliptical structure 151 can be stably fixed relative to the frame 120.

Furthermore, the frame 120 has a first surface 122. The first surface 122 faces to the display panel 130, and the first surface 122 is adjacent to the abutting surface 121. In this embodiment, the accommodation space S has a depth P relative to the first surface 122. The depth P is perpendicular to the first surface 122 and intersects with the axis T. The long diameter D of the elliptical structure 151 is longer than the depth P. In this way, when the adjusting element 150 rotates, the elliptical structure 151 of the adjusting element 150 can at least partially leave from the accommodation space S and protrude from the first surface 122 of the frame 120 so as to press on the spacer 140, such that the spacer 140 and the display panel 130 can move towards the touch panel 110 until the display panel 130 is in contact with the touch panel 110, as shown in FIG. 3.

Furthermore, the elliptical structure 151 of the adjusting element 150 has a short diameter DS. The short diameter DS intersects with the axis T, and the short diameter DS is perpendicular to the long diameter DL. In this embodiment, the short diameter DS of the elliptical structure 151 is shorter than the depth P of the frame 120. When the display panel 130 has already been in contact with the touch panel 110 and it is not necessary for the elliptical structure 151 of the adjusting element 150 to press the spacer 140, since the short diameter DS of the elliptical structure 151 is shorter than the depth P of the accommodation space S, the user can rotate the adjusting element 150 such that the elliptical structure 151 can be completely accommodated inside the accommodation space S, and the elliptical structure 151 does not press on the spacer 140, as shown in FIG. 2. Under such condition, the spacer 140 is in contact with the first surface 122 of the frame 120.

Reference is made to FIG. 4. FIG. 4 is a top view of the frame 120 of FIG. 1. In this embodiment, the frame 120 has a plurality of abutting surfaces 121. In other words, the frame 120 has a plurality of accommodation spaces S and a plurality of through holes H communicating with the accommodation spaces S. As shown in FIG. 4, the frame 120 has four accommodation spaces S and four through holes H communicating with the accommodation spaces S. In this way, the electronic apparatus 100 can be disposed with four adjusting elements 150, which are approximately located near the four corners of the frame 120. Thus, the user can rotate these adjusting elements 150 according to the actual situation in order to make the display panel 130 to be in contact with the touch panel 110.

In conclusion, when compared with the prior art, the aforementioned embodiments of the present disclosure have at least the following advantages:

(1) The user can use a simple hand tool, such as a screwdriver, to snap with the groove of the adjusting element outside the frame in order to drive the transmission portion and thus the elliptical structure to rotate about the axis, such that the spacer and the display panel move towards the touch panel until the display panel is in contact with the touch panel. Since the groove of the adjusting element is also exposed outside the frame, the user can make the display panel to be in contact with the touch panel outside the frame in a simple and convenient manner. Thus, the touching effect and the rate of emittance of the electronic apparatus can be maintained, and the structural strength of the electronic apparatus can be reinforced.

(2) Since the first jagged structures of the elliptical structure and the second jagged structures of the abutting surface are at least partially coupled with each other, no matter the magnitude of angle that the user rotates the adjusting element, by the mutual coupling between the first jagged structures of the elliptical structure and the second jagged structures of the abutting surface, the elliptical structure can be stably fixed relative to the frame.

(3) When the display panel has already been in contact with the touch panel and it is not necessary for the elliptical structure of the adjusting element to press the spacer, since the short diameter of the elliptical structure is shorter than the depth of the accommodation space, the user can rotate the adjusting element such that the elliptical structure can be completely accommodated inside the accommodation space, and the elliptical structure does not press on the spacer.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An electronic apparatus, comprising:
   a touch panel;
   a frame;
   a display panel at least partially disposed between the touch panel and the frame;
   a spacer connected with a side of the display panel facing to the frame; and
   a plurality of adjusting elements at least partially embedded in the frame and at least partially rotatable relative to the frame, each of the adjusting elements having an elliptical structure slidably connected with the spacer, wherein when at least one of the elliptical structures rotates, the spacer is pressed by the corresponding elliptical structure, such that the spacer and the display panel move towards the touch panel until the display panel is in contact with the touch panel, wherein the frame has a plurality of abutting surfaces, each of the abutting surfaces is curved along a circular locus, each of the abutting surfaces defines an accommodation space, the elliptical structures are at least partially located inside the accommodation spaces respectively.

2. The electronic apparatus of claim 1, wherein each of the adjusting elements has a transmission portion connected with the corresponding elliptical structure, the transmission portions at least partially penetrate through the frame and are exposed outside the frame.

3. The electronic apparatus of claim 2, wherein the frame has a plurality of through holes configured to allow the transmission portions to penetrate through.

4. The electronic apparatus of claim 2, wherein each of the transmission portions has a groove located at an end of the corresponding transmission portion away from the corresponding elliptical structure.

5. The electronic apparatus of claim 1, wherein each of the elliptical structures has a long diameter, each of the accommodation spaces has a diameter, the long diameters and the diameters are substantially the same.

6. The electronic apparatus of claim 5, wherein each of the elliptical structures has a plurality of first jagged structures, each of the abutting surfaces has a plurality of second jagged structures, each of the first jagged structures and the corresponding second jagged structure are at least partially coupled with each other.

7. The electronic apparatus of claim 5, wherein the frame has a first surface adjacent to the abutting surfaces, each of the accommodation spaces has a depth relative to the first surface, the long diameters are longer than the depths.

8. The electronic apparatus of claim 7, wherein each of the elliptical structures has a short diameter, the short diameters are shorter than the depths.

9. The electronic apparatus of claim 1, wherein the frame has a second surface configured to connect with the touch panel.

* * * * *